US010696160B2

(12) United States Patent
Rekapalli et al.

(10) Patent No.: US 10,696,160 B2
(45) Date of Patent: Jun. 30, 2020

(54) AUTOMATIC CONTROL OF IN-VEHICLE MEDIA

(71) Applicant: International Business Machines Corporation, Armonk, NY (US)

(72) Inventors: Krishna Teja Rekapalli, Austin, TX (US); Alexander L. Greer, Austin, TX (US); Theodora Cheng, Travis, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/203,280

(22) Filed: Nov. 28, 2018

(65) Prior Publication Data

US 2020/0164746 A1    May 28, 2020

(51) Int. Cl.
  *B60K 35/00* (2006.01)
  *B60W 40/09* (2012.01)
  *G06K 9/00* (2006.01)
  *B60W 40/08* (2012.01)

(52) U.S. Cl.
  CPC ............ *B60K 35/00* (2013.01); *B60W 40/09* (2013.01); *G06K 9/00845* (2013.01); *B60K 2370/193* (2019.05); *B60K 2370/195* (2019.05); *B60K 2370/736* (2019.05); *B60W 2040/0872* (2013.01)

(58) Field of Classification Search
  CPC .............. B60K 35/00; B60K 2370/195; B60K 2370/193; B60K 2370/736; B60W 40/09; B60W 2040/0872; G06K 9/00845
  See application file for complete search history.

(56) References Cited

U.S. PATENT DOCUMENTS

| 9,798,799 | B2 | 10/2017 | Wolverton et al. |
| 9,963,145 | B2 | 5/2018 | Penilla et al. |
| 2004/0183749 | A1* | 9/2004 | Vertegaal ............... G06F 3/011 345/7 |
| 2014/0201004 | A1 | 7/2014 | Parundekar et al. |
| 2015/0105960 | A1 | 4/2015 | Pilutti et al. |
| 2016/0267335 | A1 | 9/2016 | Hampiholi |

(Continued)

FOREIGN PATENT DOCUMENTS

| CN | 101992779 A | 3/2011 |
| KR | 101575266 B1 | 12/2015 |

OTHER PUBLICATIONS

IBM, "Interference Detection and Response for Media Playback," ip.com, an IP.com Prior Art Database Technical Disclosure, IP.com No. IPCOM000187587D, IP.com Electronic Publication Date: Sep. 11, 2009, 5 pages.

(Continued)

*Primary Examiner* — Anne Marie Antonucci
(74) *Attorney, Agent, or Firm* — Jamar K. Ray

(57) ABSTRACT

A method for automatically adjusting vehicle media may include obtaining personal data of a vehicle operator and obtaining contextual data about the vehicle operating. The method may further include generating a distraction-level value that represents a degree to which the vehicle operator may be distracted from the media. The method may further include generating a distraction threshold value. The method may further include determining that the distraction-level value exceeds the distraction threshold value and adjusting the media in response.

18 Claims, 11 Drawing Sheets

(56) References Cited

U.S. PATENT DOCUMENTS

2017/0182956 A1* 6/2017 Naboulsi ............. B60R 11/0264
2018/0061415 A1   3/2018 Penilla et al.
2019/0241190 A1* 8/2019 Fung ....................... B60R 25/25

OTHER PUBLICATIONS

Anonymous, "Method and Apparatus for Dynamic Media Control," ip.com, an IP.com Prior Art Database Technical Disclosure, IP.com No. IPCOM000200688D, IP.com Electronic Publication Date: Oct. 25, 2010, 4 pages.

Anonymous, "Selecting Advertisements based on Driver's Attention Capacity," ip.com, an IP.com Prior Art Database Technical Disclosure, IP.com No. IPCOM000217767D, IP.com Electronic Publication Date: May 11, 2012, 3 pages.

Anonymous, "Method for restricting the use of a media device by vehicle operator." ip.com, an IP.com Prior Art Database Technical Disclosure, IP.com No. IPCOM000253753D, IP.com Electronic Publication Date: May 1, 2018, 3 pages.

Lee, et al., "Distraction Detection and Mitigation Through Driver Feedback," NHTSA, U.S. Department of Transportation, Report No. DOT HS 8111 547B, Report Date May 2013, 283 pages.

Basacik, et al., "Driver distraction from in-vehicle sources: a review of TRL research," TRL Insight Report, INS002, Published 2009, ISBN 978-1-84608-793-6, 48 pages.

Heart Math Institute, "Scientific Foundation of the HeartMath System," https://www.heartmath.org/programs/emwave-self-regulation-technology-theoretical-basis, printed Nov. 28, 2018, 8 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATIC CONTROL OF IN-VEHICLE MEDIA

BACKGROUND

The present disclosure relates to in-vehicle media, and more specifically, to automatic control of in-vehicle media.

Vehicle operators may listen to media while operating a vehicle. To enjoy the full content of the media, vehicle operators may need to adjust the media while operating the vehicle.

SUMMARY

Some embodiments of the present disclosure can be illustrated as a method for adjusting vehicle media. The method may include obtaining personal data of a vehicle operator. The vehicle operator may be operating a vehicle while media playback occurs within the vehicle. The method may further include obtaining contextual data about the operating. The method may further include generating a distraction-level value based at least in part on the personal data. The distraction-level value may represent a potential degree to which the vehicle operator is distracted from the media. The method may further include generating a distraction threshold value based at least in part on the contextual data. The method may further include comparing the distraction-level value to the distraction threshold value. The method may further include determining at a first time that the distraction-level value exceeds the distraction threshold value. The method may further include adjusting the media in response to the determining at the first time.

Some embodiments of the present disclosure can be illustrated as a system comprising a processor and a memory in communication with the processor, the memory containing program instructions that, when executed by the processor, are configured to cause the processor to perform the aforementioned method.

Some embodiments of the present disclosure can be illustrated as a computer program product, the computer program product comprising a computer readable storage medium having program instructions embodied therewith, the program instructions executable by a computer to cause the computer to perform the aforementioned method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
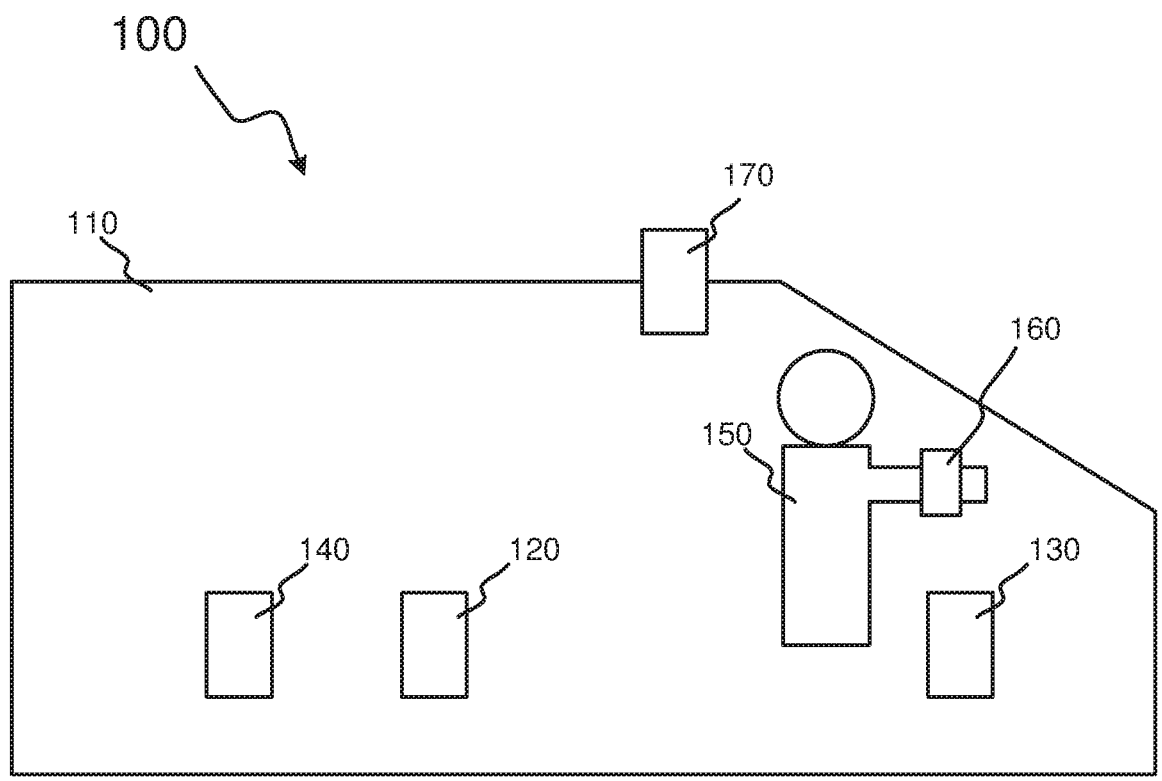
FIG. 1 depicts an example system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to controlling in-vehicle media, more particular aspects relate to automatically controlling in-vehicle media. While the present disclosure is not necessarily limited to such applications, various aspects of the disclosure may be appreciated through a discussion of various examples using this context.

Vehicle operators may listen to media, such as audiobooks and music playlists, while operating vehicles. Safe operation of a vehicle may require a vehicle operator to divert attention from, or be distracted from, the media in order to manage the vehicle. For example, if a vehicle suddenly encounters a severe storm or a foreign object on a roadway, the vehicle operator may need to adapt the vehicle (e.g. slow down, change lanes, and/or activate windshield wipers) to maintain vehicle and/or passenger safety. However, such adaptations may cause the vehicle operator to be distracted from the in-vehicle media and miss at least a portion of its content. Furthermore, it may be difficult or unsafe to adjust (e.g. pause, stop, mark a location of) the media while adapting the vehicle.

To address these and other problems, embodiments of the present disclosure include a method for automatically adjusting in-vehicle media based on a determination that a vehicle operator is likely distracted from the media. The determination is, in some embodiments, based on obtained personal data of a vehicle operator and obtained contextual data regarding the environment in which the vehicle operator operates the vehicle. For example, embodiments of the present disclosure may automatically adjust the in-vehicle media by pausing, marking, or stopping playback of the media. The automatic adjustment may be in response to analyzing data, such as the vehicle operator's heart rate variance and a braking frequency of the vehicle, and determining that the vehicle operator is distracted from media, such as an audiobook, being played within the vehicle. As a result, embodiments of the present disclosure may allow the vehicle operator to enjoy the full content of in-vehicle media despite circumstances that may temporarily require the vehicle operator to focus on stimuli other than the media.

Embodiments of the present disclosure may determine whether a vehicle operator's potential level of distraction from in-vehicle media exceeds a threshold level of distraction, such that an automatic adjustment of the media may be warranted. The determination may be based on obtained personal data of the vehicle operator as well as obtained contextual data regarding the vehicle operator's operating environment. Furthermore, in some embodiments, the personal data may be analyzed and quantified as a distraction-level value. The distraction-level value may represent a potential degree to which the vehicle operator is distracted from the media (e.g., a 0.10 distraction-level value may indicate that the vehicle operator may be highly distracted from the media, and a 0.90 distraction-level value may indicate that the vehicle operator may be barely distracted from the media). In some embodiments, the contextual data may be analyzed and quantified as a distraction threshold value. The distraction threshold value may represent an estimated maximum amount of distraction a vehicle operator may sustain without being distracted from media playing within the vehicle, in view of the vehicle's environment and/or the circumstances surrounding the vehicle's operation. In some embodiments, the distraction-level value may be compared to the distraction threshold value to determine whether the vehicle operator's potential level of distraction from the media requires that the media be adjusted (e.g. paused, stopped, marked for later reference). In some embodiments, a processing device may be trained to determine a vehicle operator's potential level of distraction from media by applying artificial intelligence to the obtained personal data and the obtained contextual data. Embodiments of the present disclosure may determine when to automatically adjust the media by incorporating or not incorporating analysis by one or more neural networks.

The personal data of the vehicle operator that may be used to determine a distraction-level value may include metrics, such as heart rate, heart rate variance, and images of the vehicle operator. Such metrics may be correlated with the vehicle operator's potential level of distraction from media while operating the vehicle.

For example, in some embodiments, the vehicle operator's heart rate may indicate the vehicle operator's mental state; thus, it may imply the vehicle operator's level of distraction from the media. For example, a faster heart rate, such as 100 beats per minute (bpm) may indicate that the vehicle operator is stressed or anxious and more likely to be distracted from media while operating the vehicle. In contrast, a lower heart rate, such as 60 bpm may indicate that the vehicle operator is calm and more likely to be attentive to media while operating the vehicle.

Furthermore, in some embodiments the vehicle operator's heart rate variance (i.e. variations in the time interval between consecutive heartbeats) may similarly indicate the vehicle operator's level of distraction from the media. For example, inconsistent heart rate variances may indicate that a vehicle operator is frustrated and less likely to be attentive to media while operating a vehicle.

In some embodiments, images of the vehicle operator may indicate the vehicle operator's level of distraction from media while operating the vehicle. Such images may include photographs and/or video recordings, such as a live video feed to monitor the vehicle operator's behavior. For example, one or more cameras inside the vehicle may show that the vehicle operator is unlikely to be attentive to the media (e.g., the vehicle operator may be looking into the rear of the vehicle or in a direction other than the direction in which the vehicle is moving and/or exhibiting facial expressions indicative of stress, strong emotion, or drowsiness). Such images may be analyzed via a processor using imaging techniques and artificial intelligence to predict a vehicle operator's mental state and/or whether the vehicle operator is likely distracted from the media.

Next, contextual data regarding the vehicle operator's surroundings during operation of the vehicle may be used to determine a distraction threshold value. Contextual data may include accelerometer data, vehicle "Internet of Things" ("IoT") sensor data, weather data, location data, and/or video images of the interior or vicinity of the vehicle.

In some embodiments, accelerometer data may provide relevant information about the vehicle's operation. For example, accelerometer data may provide information, such as how sharply the vehicle is being turned, whether the vehicle is rapidly accelerating and/or decelerating, and/or whether the vehicle is swerving. Accordingly, the accelerometer data may assist in characterizing the vehicle operator's driving behavior and/or determining whether a present driving behavior diverges from a typical driving behavior.

In some embodiments, vehicle IoT sensors may also provide relevant information about the vehicle's operation. Vehicle IoT sensors may include devices, such as cameras, braking sensors, global positioning systems, speedometers, and accelerometers. For example, a braking sensor may provide information about the vehicle operator's braking frequency. Additionally, a vehicle camera may provide information about the proximity of the vehicle to other objects. A vehicle camera may also provide information about the interior of the vehicle, such as whether objects in the vehicle may be blocking the vehicle operator's visibility, or whether other passengers are traveling in the vehicle.

In some embodiments, vehicle weather sensors may provide information about the environment in which the vehicle is operated. For example, such sensors may detect parameters, such as precipitation, fog, or icy road conditions.

In some embodiments, location sensors may provide additional information about the vehicle's environment. For example, a location sensor, such as a global positioning system device, may detect information, such as whether a currently traversed route is frequently traveled or new, whether a vehicle is being operated in a construction zone, or whether a vehicle is being operated in traffic.

By considering both the personal data and the contextual data, embodiments of the present disclosure may tailor a determination to adjust the media according to a mental state of the vehicle operator and an environment of the vehicle operator. As a result, embodiments of the present disclosure may accurately determine when a media adjustment may be warranted.

It is to be understood that the aforementioned advantages are example advantages and should not be construed as limiting. Embodiments of the present disclosure can contain all, some, or none of the aforementioned advantages while remaining within the spirit and scope of the present disclosure.

Turning to the figures, FIG. 1 illustrates an example embodiment of a system 100 according to the present disclosure. In the illustrated embodiment, the system 100 includes a vehicle 110 equipped with a storage/processing device 120. The storage/processing device 120 may perform functions, such as obtaining, storing, analyzing, and processing data from one or more weather sensors 170, one or more IoT devices 140, mobile device 130, and/or wearable device 160. The storage/processing device may also utilize artificial intelligence and machine learning to process and analyze data. Additionally, the storage/processing device may adjust media playing within the vehicle 110. In some embodiments, the storage/processing device 120 may execute computer-readable instructions to perform one or more of the methods described herein.

For example, the storage/processing device 120 may communicate with the vehicle weather sensor(s) 170, vehicle IoT device(s) 140, mobile device 130, and/or wearable device(s) 160 to obtain personal data of the vehicle operator 150 and contextual data regarding the vehicle operator's environment. The storage/processing device may then generate a distraction-level value to predict a likelihood that the vehicle operator is distracted from the media. The storage/processing device may also generate a distraction threshold value and compare it to the distraction-level value. Upon determining that the distraction-level value exceeds the distraction threshold value, the storage/processing device may adjust the media.

Vehicle 110 may be of any type used for transportation consistent with the embodiments of this disclosure, such as an automobile, motorcycle, watercraft, or aircraft. Weather sensor(s) 170 may include devices for measuring properties, such as temperature, humidity, fog, and precipitation. IoT device(s) 140 may include devices, such as cameras, braking sensors, global positioning systems, speedometers, and accelerometers.

Additionally, system 100 may include a mobile device 130, such as a mobile phone, and/or a wearable device 160, such as a smartwatch or fitness monitor, worn by a vehicle operator 150. Mobile device 130 may include additional devices, such as a camera, global positioning system, and accelerometer. Wearable device 160 may be capable of measuring biometric properties, such as the vehicle operator's heart rate and heart rate variance over time.

Figure 2:
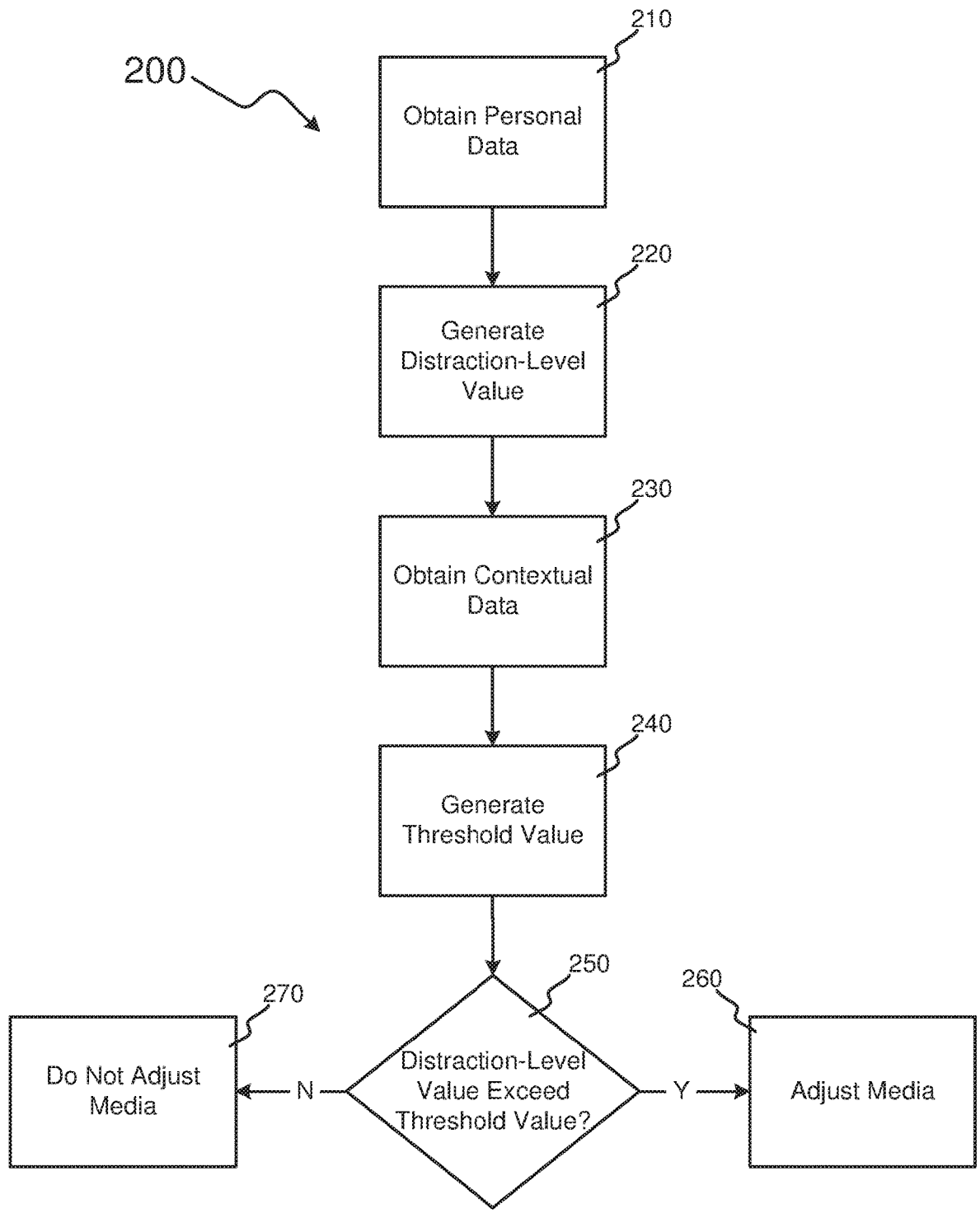
FIG. 2 depicts a flowchart of an example method for adjusting media, in accordance with embodiments of the present disclosure.

FIG. 2 illustrates an embodiment of an example method 200 for adjusting the media according to the present disclosure. One or more operations of method 200 may be performed by a processor (e.g., storage/processing device 120 of FIG. 1). Method 200 includes a step 210 to obtain personal data of the vehicle operator. The personal data may include information, such as heart rate measurements, heart rate variance measurements, and images of the vehicle operator. The obtained personal data may be used to generate a distraction-level value in step 220.

For example, the vehicle operator's heart rate measurements may indicate a mental state of the vehicle operator. Such a mental state may imply a likeliness that the vehicle operator is distracted from the media. This likeliness can be quantified as an implied distraction value and combined with additional implied distraction values to generate a distraction-level value.

In an example, a vehicle operator's measured heart rate of 130 beats per minute may indicate that the vehicle operator is anxious. Furthermore, anxiety may be correlated with a 70% likelihood that the vehicle operator will be distracted from the media, which may be quantified as a 0.70 implied distraction value. Thus, the measured heart rate of 130 beats per minute may be correlated with the 0.70 implied distraction value. Similarly, the vehicle operator's measured heart rate variance over time may correspond to a profile of someone who is angry. Furthermore, anger may be associated with an 80% likelihood that the vehicle operator will be distracted from the media, which may be quantified as a 0.80 implied distraction value. Accordingly, the vehicle operator's measured heart rate variance may be correlated with the 0.80 implied distraction value. To generate a distraction-level value, the two implied distraction values may be averaged to obtain a 0.75 distraction-level value.

Step 230 includes obtaining contextual data regarding the vehicle operator's surroundings during operation of the vehicle. The contextual data may contain information, such as accelerometer measurements, location data, and weather data. The obtained contextual data may be used to generate a distraction threshold value in step 240.

For example, a measured braking frequency of 15 events per minute may indicate that the vehicle is in stop-and-go traffic. Furthermore, the stop-and-go traffic environment may be correlated with an implied threshold value of 0.90 because the vehicle operator may have a low likelihood of being distracted from the media during stop-and-go traffic. Additionally, the detection of icy road conditions may be correlated with an implied threshold value of 0.50 because the vehicle operator may be more likely to be distracted from the media when driving on an icy road. To generate a distraction threshold value, the two implied distraction values may be averaged to obtain a 0.70 distraction threshold value.

Step 250 includes comparing the generated distraction-level value to the generated distraction threshold value to determine whether the distraction-level value exceeds the distraction threshold value. For example, continuing with the examples above, in step 250, the 0.75 distraction-level value would be determined to exceed the 0.70 distraction threshold value.

Step 260 includes adjusting the media in response to determining that the distraction-level value exceeds the distraction threshold value. For example, a processor (e.g., storage/processing device 120 of FIG. 1) may adjust the media by stopping, pausing, and/or marking a playback location (e.g. providing a digital bookmark of a specific playback location within an audiobook) of the media.

Step 270 includes not adjusting the media in response to determining that the distraction-level value does not exceed the distraction threshold value.

Figure 3:
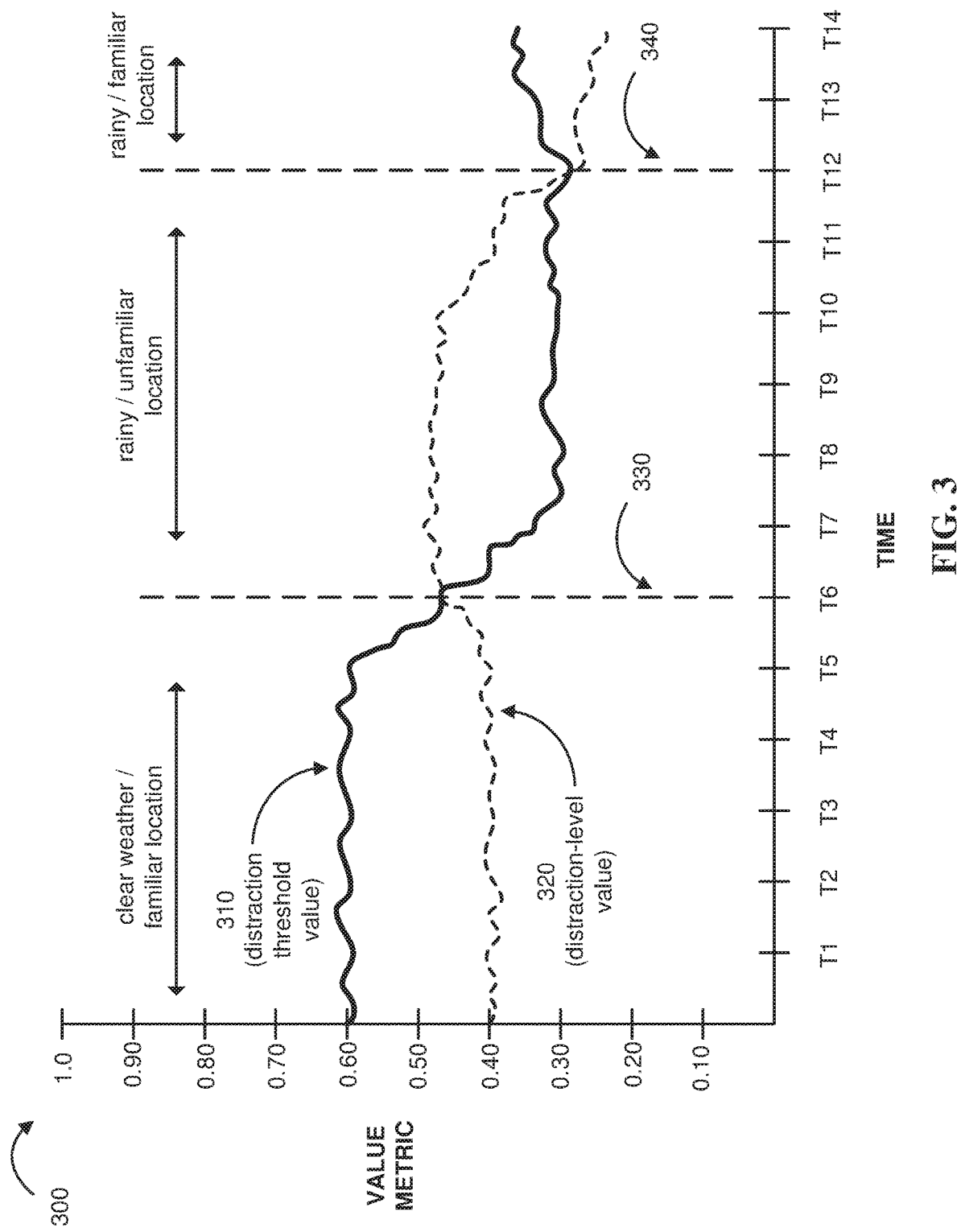
FIG. 3 depicts an example plot of generated distraction-level values and distraction threshold values over time, in accordance with embodiments of the present disclosure.

FIG. 3 illustrates an example plot 300 of generated distraction-level values and distraction threshold values with respect to time. The distraction-level value curve 320 may be generated in real time, based on the personal data of the vehicle operator.

For example, during time T0 to approximately T6, personal data, such as image data acquired by an IoT camera within the vehicle and heart rate data from a smartwatch worn by the vehicle operator, may indicate that the vehicle operator appears to have an attentive, relaxed mental state; thus, a distraction-level value of approximately 0.40 may be generated over that time period. During approximately time T6 to T12, the personal data of the vehicle operator may indicate that the vehicle operator has transitioned to a slightly agitated mental state; thus, the vehicle operator's distraction-level value increases to nearly 0.50 during that period. During time T12 to T14, the personal data of the vehicle operator may indicate that the vehicle operator appears to have a more attentive, relaxed mental state than during the period T0 to T6; thus, a distraction-level value less than 0.30 may be generated over that time period.

The distraction threshold value curve 310 may be generated in real time, based on the obtained contextual data. For example, during time T0 to approximately T5, contextual data obtained from a vehicle weather sensor and a vehicle global positioning system may indicate clear weather conditions and that the vehicle is located in an area commonly traversed by the vehicle operator. Accordingly, a distraction threshold value of approximately 0.60 may be generated for that time period. Next, during approximately time T5 to T12, the vehicle weather sensor may detect a transition to steady rainfall. Furthermore, the vehicle global positioning system may detect that the vehicle is located in an area that has not been traversed by the vehicle operator. In response to such contextual data, the distraction threshold value may decrease to approximately 0.30 during that time period. During approximately time T12 to T14, the obtained contextual data may indicate that the vehicle is located in an area that is commonly traversed by the vehicle operator and that steady rainfall persists. Accordingly, the distraction threshold value may increase to approximately 0.35 during that time period.

Marker 330 indicates the time when the distraction-level value 320 begins to exceed the distraction threshold value 310. At that time, a processor (e.g., storage/processing device 120 of FIG. 1) may adjust the media (e.g., pause, stop, or mark a location of the media for later reference). Marker 340 indicates the time when the distraction-level value begins to fall below the distraction threshold value. At that time, a processor (e.g., storage/processing device 120 of FIG. 1) may prompt the vehicle operator regarding the media. For example, the processor may prompt the vehicle operator with options, such as unpausing the media or restarting the playback media from a specific location.

Figure 4:
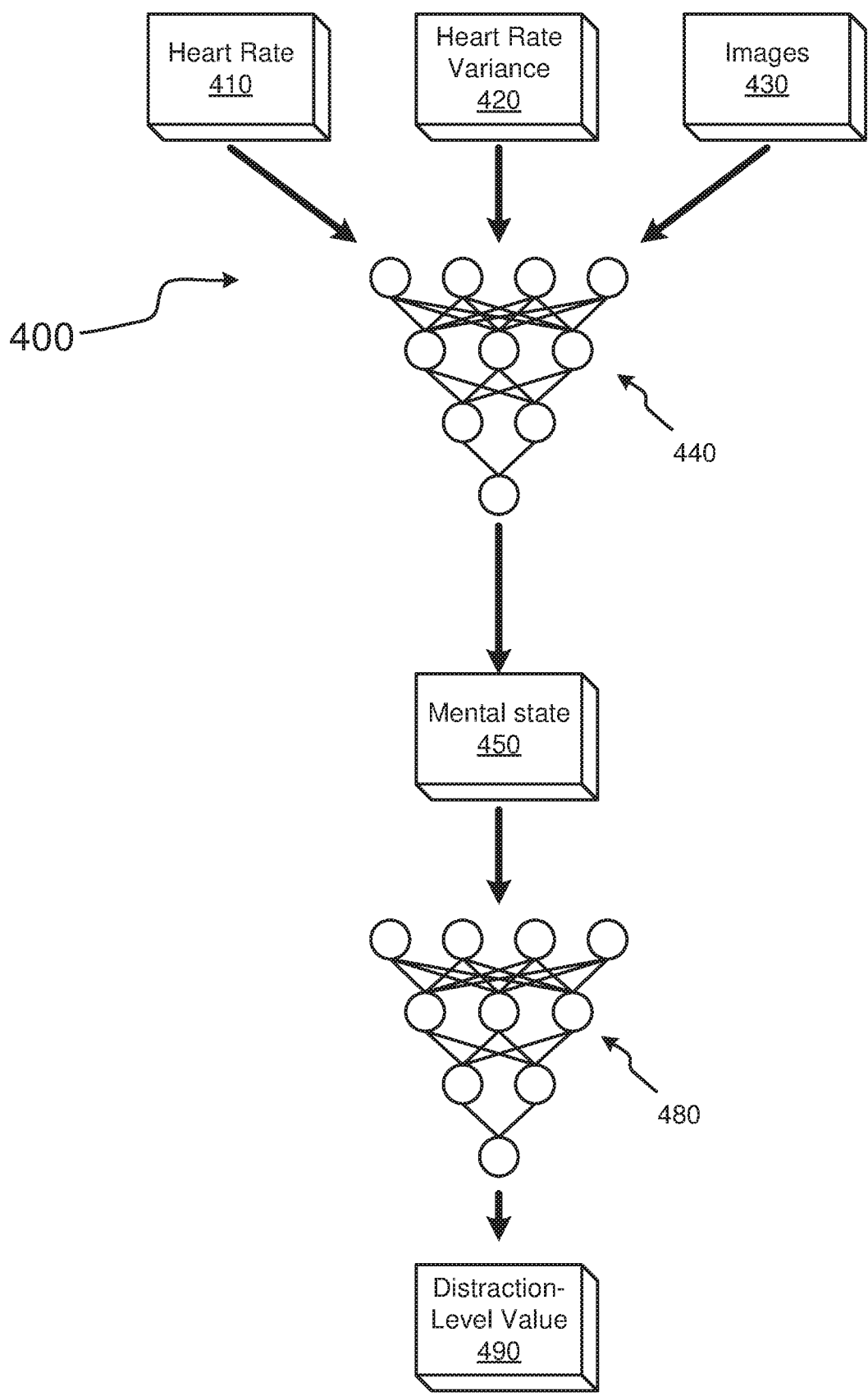
FIG. 4 depicts a flowchart of an example method for determining a distraction-level value, in accordance with embodiments of the present disclosure.

FIG. 4 illustrates a flowchart of an example system 400 for determining a distraction-level value using one or more neural networks. One or more operations of system 400 may be performed by a processor (e.g., storage/processing device 120 of FIG. 1).

System 400 includes inputting personal data of the vehicle operator, such as heart rate 410, heart rate variance 420, and images of the vehicle operator 430 into first neural network 440. The first neural network 440 may then generate a distraction-level value 490. First neural network 440 may have been trained to determine one or more mental states 450 of the vehicle operator, based on data correlations formed within the neural network. For example, the neural network may determine that the vehicle operator has a frustrated, calm, or anxious mental state. Next, the determined mental state of the vehicle operator may be input into second neural network 480, which may have been trained to determine relationships between mental states of the vehicle operator and distraction-level values. Thus, second neural network 480 may determine an accurate distraction-level value from a mental state of the vehicle operator.

While, as illustrated, neural networks 440 and 480 are separate neural networks, in some embodiments neural network 440 and neural network 480 may functionally be one connected neural network that performs two linked determinations. In other embodiments, neural networks 440 and 480 may be completely separate (e.g., on different processors) such that outside intervention may be required to transfer the output from neural network 440 to neural network 480 (e.g., a first user sending the output of neural network 440 to a second user, who inputs it into neural network 480).

While, as illustrated, system 400 includes two neural networks with two separate outputs, in some embodiments system 400 may be configured differently. For example, system 400 may be configured with a single neural network that is trained to receive personal data of a vehicle operator (e.g., heart rate 410, heart variation 420, and images of the vehicle operator 430). That single neural network may be trained to process the personal data, and based on recognized patterns within the personal data, output a distraction-level value (e.g., distraction-level value 490). In these embodiments, system 400 may not include explicitly identifying mental states of the vehicle operator. However, in some instances, the recognized patterns in the personal data on which the output of the distraction-level value is based may also happen to correlate with specific mental states of the vehicle operator.

Figure 5:
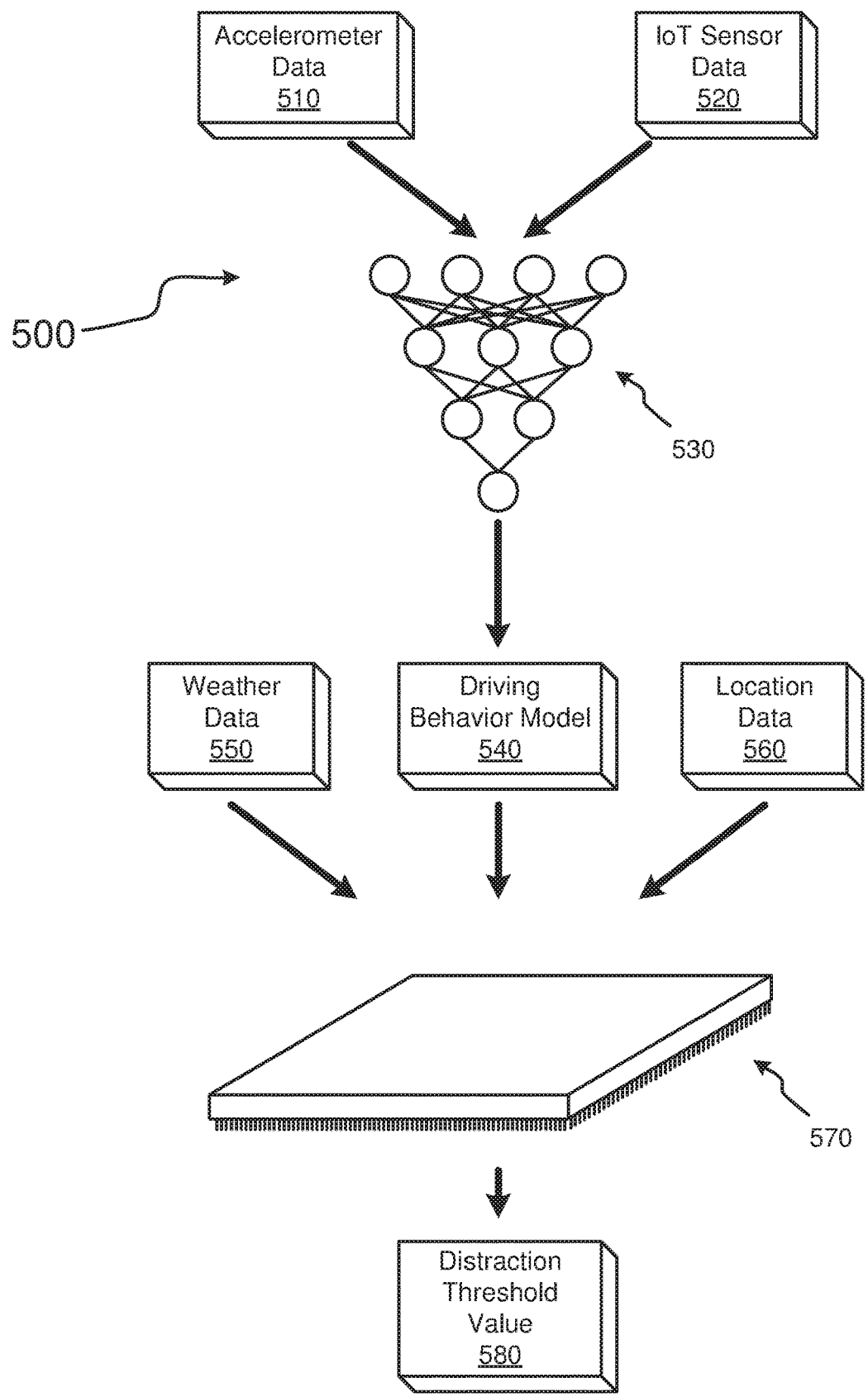
FIG. 5 depicts a flowchart of an example method for determining a distraction threshold value, in accordance with embodiments of the present disclosure.

FIG. 5 illustrates a flowchart of an example system 500 for determining a distraction threshold value using one or more neural networks. One or more operations of system 500 may be performed by a processor (e.g., storage/processing device 120 of FIG. 1). System 500 includes contextual data, illustrated here by accelerometer data 510 and IoT sensor data 520 being input into neural network 530. While, as illustrated, system 500 only discloses utilizing accelerometer data 510 and IoT sensor data 520, in other embodiments any contextual data consistent with the embodiments of this disclosure may be input into neural network 530 (or an analogous neural network). Neural network 530 then generates a driving behavior profile 540, based on data correlations made within the neural network. By generating the driving behavior profile 540, the system 500 may learn and account for the vehicle operator's driving style; thus, the system may generate an accurate distraction threshold value for determining when to adjust the media.

For example, contextual data, such as braking patterns from a braking sensor, vehicle acceleration patterns from an accelerometer, and velocity measurements from a speedometer may indicate that a vehicle operator regularly brakes with high frequency, accelerates sharply, and travels at a high velocity. From this data, neural network 530 may develop a driving behavior profile 540 of the vehicle operator. In some embodiments, the driving behavior profile may take the form of a specific preestablished designation, such as "aggressive driver," that corresponds with the contextual data. In some embodiments, the driving behavior profile may take the form of an alphanumeric or graphical output that corresponds with the contextual data. Furthermore, the driving behavior profile may serve as a baseline for comparing later-acquired contextual data so that the system 500 may distinguish abnormal driving behavior from customary driving behavior by the vehicle operator. Accordingly, embodiments of the present disclosure may modify the distraction threshold value to account for abnormal driving behavior that may contribute to the vehicle operator being distracted from the media.

Processor 570 may receive and analyze the driving behavior profile 540, as well as weather data 550 and location data 560 to determine the distraction threshold value 580.

Figure 6:
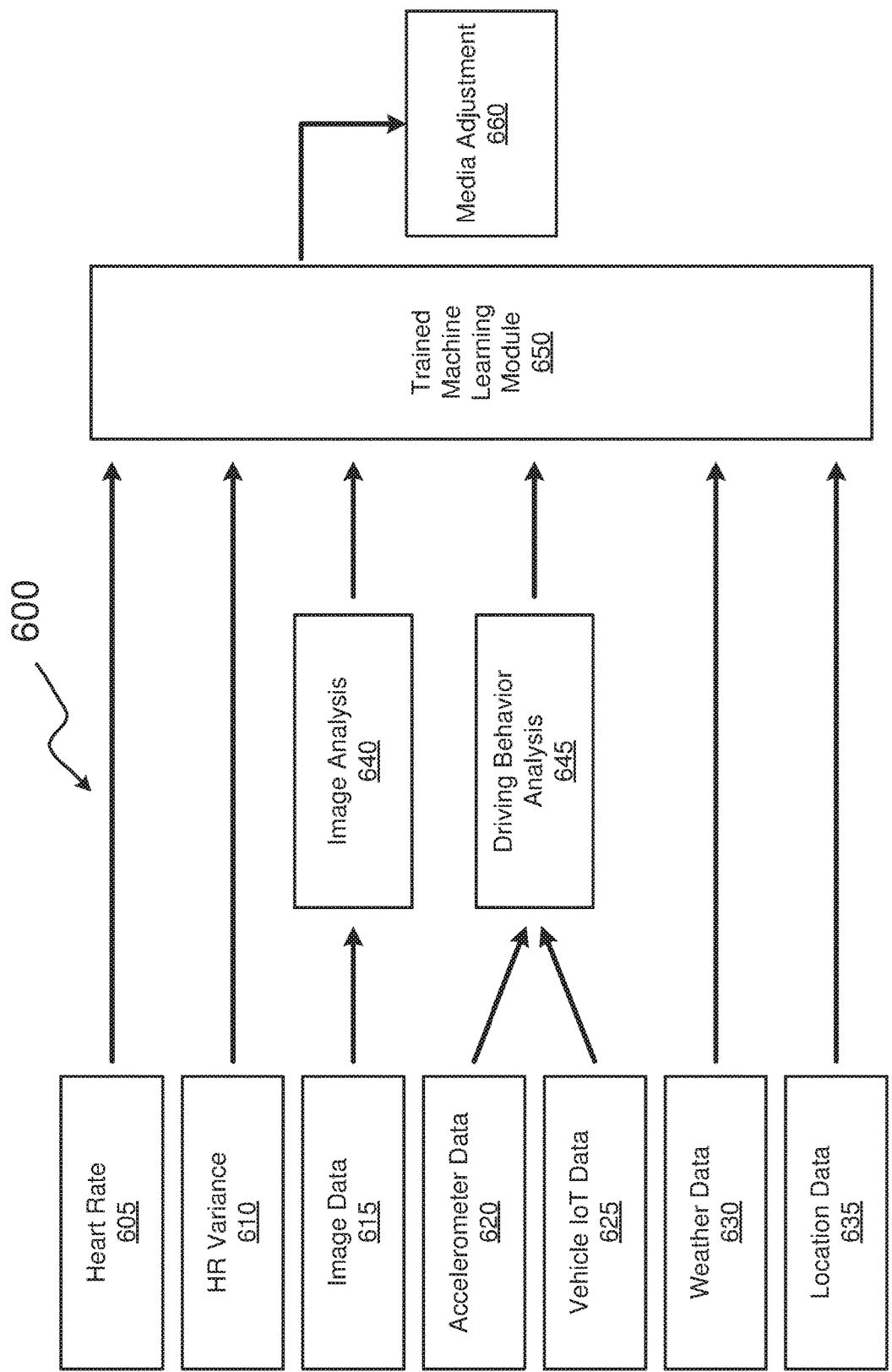
FIG. 6 depicts an example system block diagram, in accordance with embodiments of the present disclosure.

FIG. 6 illustrates a block diagram of an example system 600 according to the present disclosure. System 600 includes a trained machine learning module 650, which may include one or more processors and/or neural networks. Learning module 650 may receive personal data, such as heart rate 605, heart rate variance 610, and image data 615 from one or more devices in communication with the learning module 650. Additionally, an image analysis module 640, which may include one or more processors and/or neural networks, may analyze the image data 615 before it is received by the learning module 650.

For example, image analysis module 640 may implement digital image analysis techniques to recognize and characterize facial expressions appearing in one or more images of a vehicle operator. The image analysis module may then transmit the characterizations to the learning module in the form of an alphanumeric or graphical output.

Learning module 650 may also receive contextual data, such accelerometer data 620, vehicle IoT data 625, weather data 630, and location data 635 from one or more devices in communication with the learning module 650. Additionally, a driving behavior analysis module 645, which may include one or more processors and/or neural networks, may analyze the accelerometer data 620 and the vehicle IoT data 625 before it is received by the learning module 650.

The learning module 650 may generate and compare a distraction-level value and a distraction threshold value to determine when to perform a media adjustment 660.

Neural networks may be trained to recognize patterns in input data by a repeated process of propagating training data through the network, identifying output errors, and altering the network to address the output error. Training data that has been reviewed by human annotators is typically used to train neural networks. Training data is propagated through the neural network, which recognizes patterns in the training data. Those patterns may be compared to patterns identified in the training data by the human annotators in order to assess the accuracy of the neural network. Mismatches between the patterns identified by a neural network and the patterns identified by human annotators may trigger a review of the neural network architecture to determine the particular neurons in the network that contributed to the mismatch. Those particular neurons may then be updated (e.g., by updating the weights applied to the function at those neurons) in an attempt to reduce the particular neurons' contributions to the mismatch. This process is repeated until the number of neurons contributing to the pattern mismatch is slowly reduced, and eventually the output of the neural network changes as a result. If that new output matches the expected output based on the review by the human annotators, the neural network is said to have been trained on that data.

Once a neural network has been sufficiently trained on training data sets for a particular subject matter, it may be used to detect patterns in analogous sets of live data (i.e., non-training data that have not been previously reviewed by human annotators, but that are related to the same subject matter as the training data). The neural network's pattern recognition capabilities can then be used for a variety of applications. For example, a neural network that is trained on a particular subject matter may be configured to review live data for that subject matter and predict the probability that a potential event associated with that subject matter is occurring or will occur.

Figure 7:
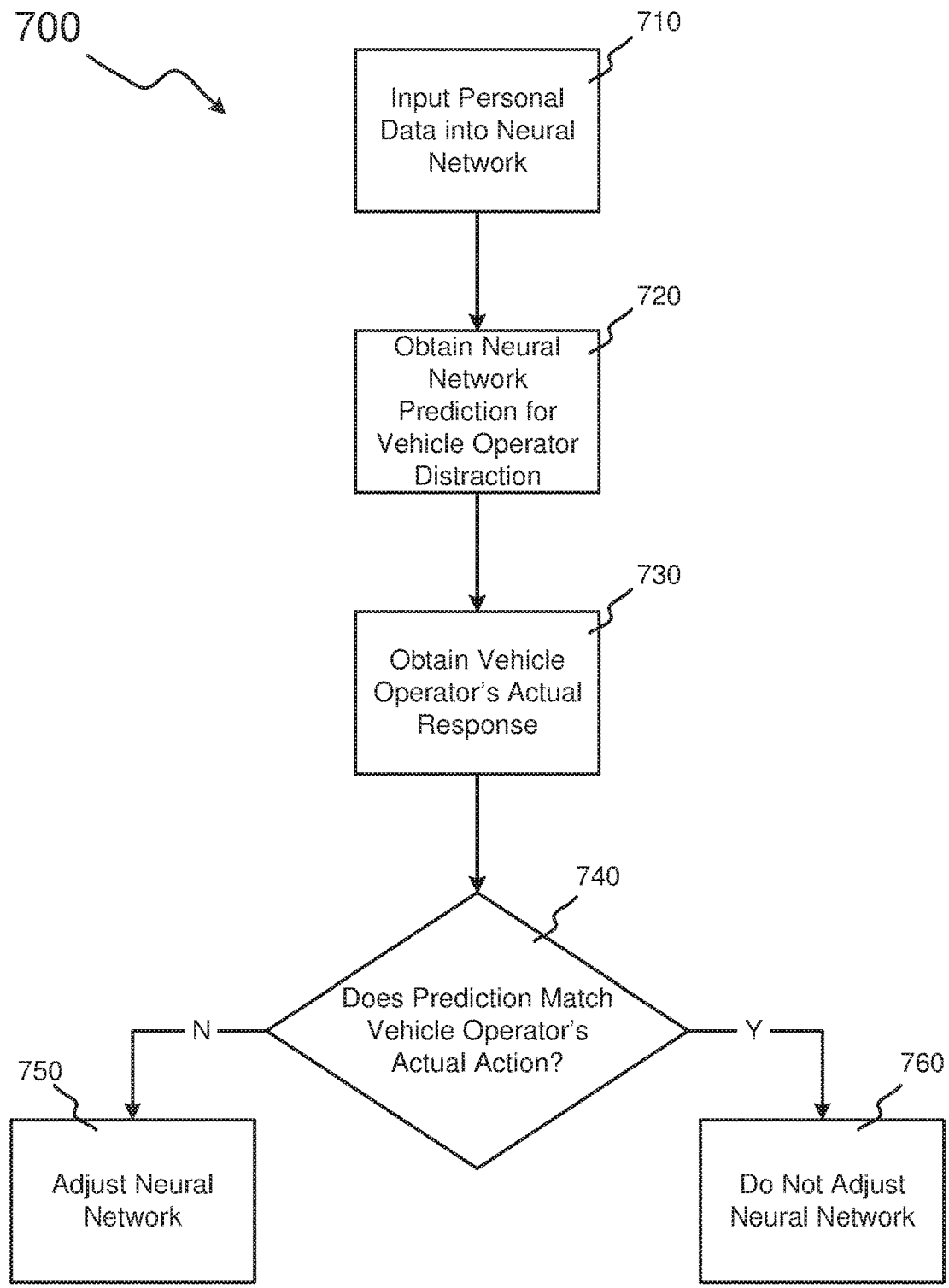
FIG. 7 depicts an example method for training a neural network, in accordance with embodiments of the present disclosure.

FIG. 7 illustrates an embodiment of an example method 700 for training, using a set of training data, one or more neural networks to predict a vehicle operator's distraction from media playback. In some embodiments, training data may be data related to a user's operation of a vehicle at a particular time in the past. In step 710, personal data about a vehicle operator at the particular time is input into the neural network(s). The personal data may include information such as heart rate, heart rate variance, and images of the vehicle operator. Additionally, the data input into the neural network(s) may take various formats, such as alphanumeric formats or graphical formats.

Step 720 includes obtaining a prediction 720 from the neural network regarding whether the vehicle operator was distracted from the media at the particular time. In some embodiments, this prediction may have a direct bearing on whether media adjustment would have been appropriate at the particular time. The prediction may be based on correlations between the input training data that are formed within the neural network.

Step 730 includes obtaining a vehicle operator's actual action with respect to the media near the particular time. The vehicle operator's action with respect to the media near the particular time may be an indication of whether the vehicle operator was distracted from the media at the particular time. In some embodiments, for example, the vehicle operator's actual action may include whether the vehicle operator stopped playback of the vehicle media at the particular time. In some embodiments, the vehicle operator's actual action may include whether the vehicle operator, at some time after the particular time, rewound the vehicle media or commanded the vehicle media to skip backwards to replay the vehicle media at or slightly before or slightly after the particular point in time.

In some embodiments, the vehicle operator's actual action may be categorized by a human developer of the neural network. For example, a human developer may attach an actual distraction value (e.g., "yes" or "no," "1" or "0," "TRUE" or "FALSE") to the actual response that states whether the response is indicative of distraction from the media. In another example, a list of such actual distraction values may be connected to various potential vehicle operator actions in a legend/key. In these embodiments, the vehicle operator's actual action could be cross referenced against the legend/key to determine whether the appropriate actual distraction value.

Step 740 includes determining whether the obtained prediction matches the obtained actual action from the vehicle operator. In some embodiments, this may take the form of comparing the prediction against an actual distraction value for the actual action. Step 750 includes adjusting the neural network when the obtained prediction does not match the obtained response from the vehicle operator (e.g., through back propagation). Alternatively, step 760 includes not adjusting the neural network when the obtained prediction does match the obtained response from the vehicle operator.

Figure 8:
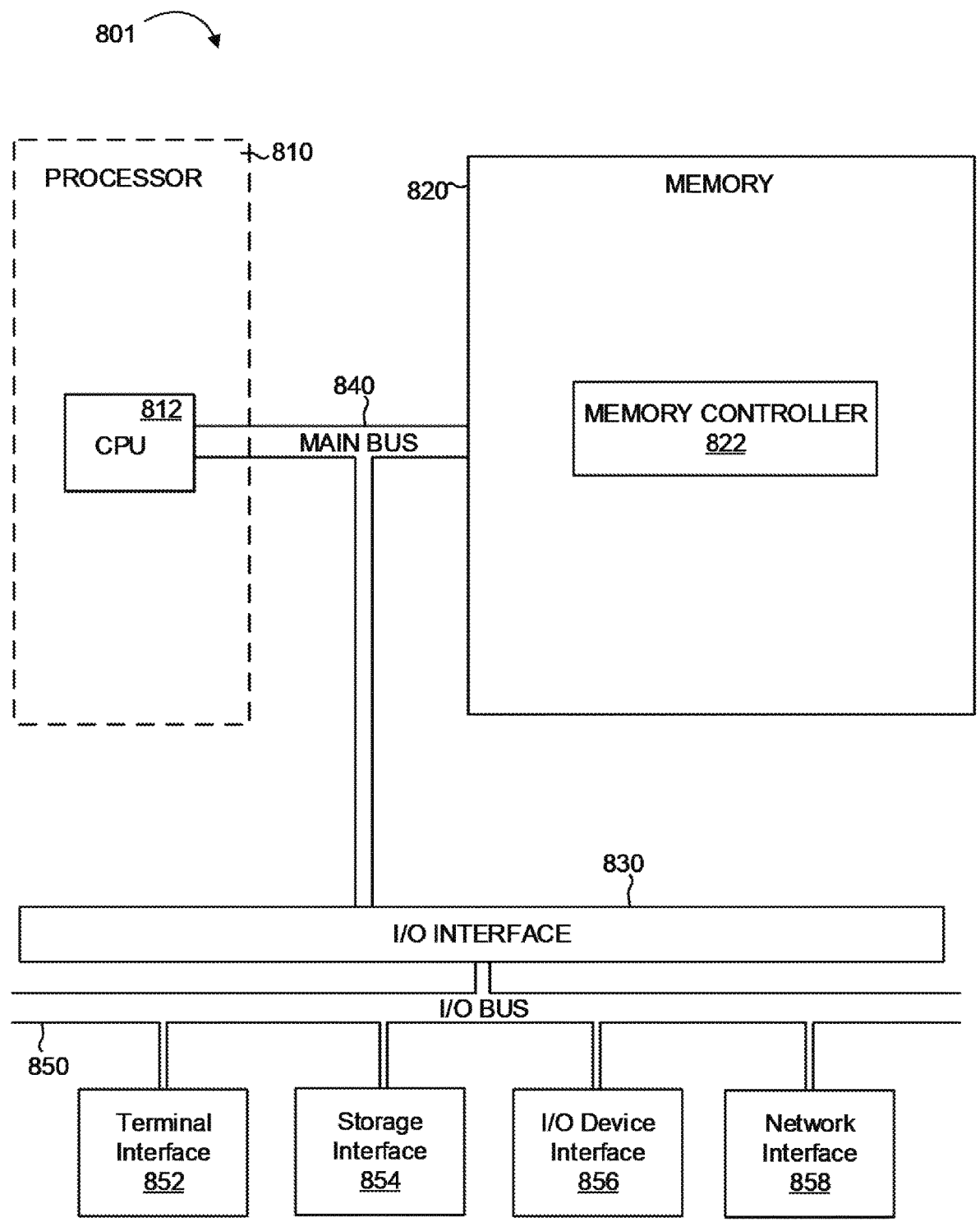
FIG. 8 depicts the representative major components of a computer system that may be used in accordance with embodiments of the present disclosure.

FIG. 8 depicts the representative major components of an exemplary Computer System 801 that may be used in accordance with embodiments of the present disclosure. The particular components depicted are presented for the purpose of example only and are not necessarily the only such variations. The Computer System 801 may comprise a Processor 810, Memory 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may be comprised of one or more CPUs 812. The Processor 810 may additionally be comprised of one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may be comprised of one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may be comprised of a Memory Controller 822 and one or more memory modules for temporarily or permanently storing data (not depicted). In some embodiments, the Memory 820 may comprise a random-access semiconductor memory, storage device, or storage medium (either volatile or nonvolatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may comprise an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may comprise the Terminal Interface 852, the Storage Interface 854, the I/O Device Interface 856, and the Network Interface 858. In some embodiments, the various interfaces may comprise a subset of the aforementioned interfaces (e.g., an embedded computer system in an industrial application may not include the Terminal Interface 852 and the Storage Interface 854).

Logic modules throughout the Computer System 801— including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
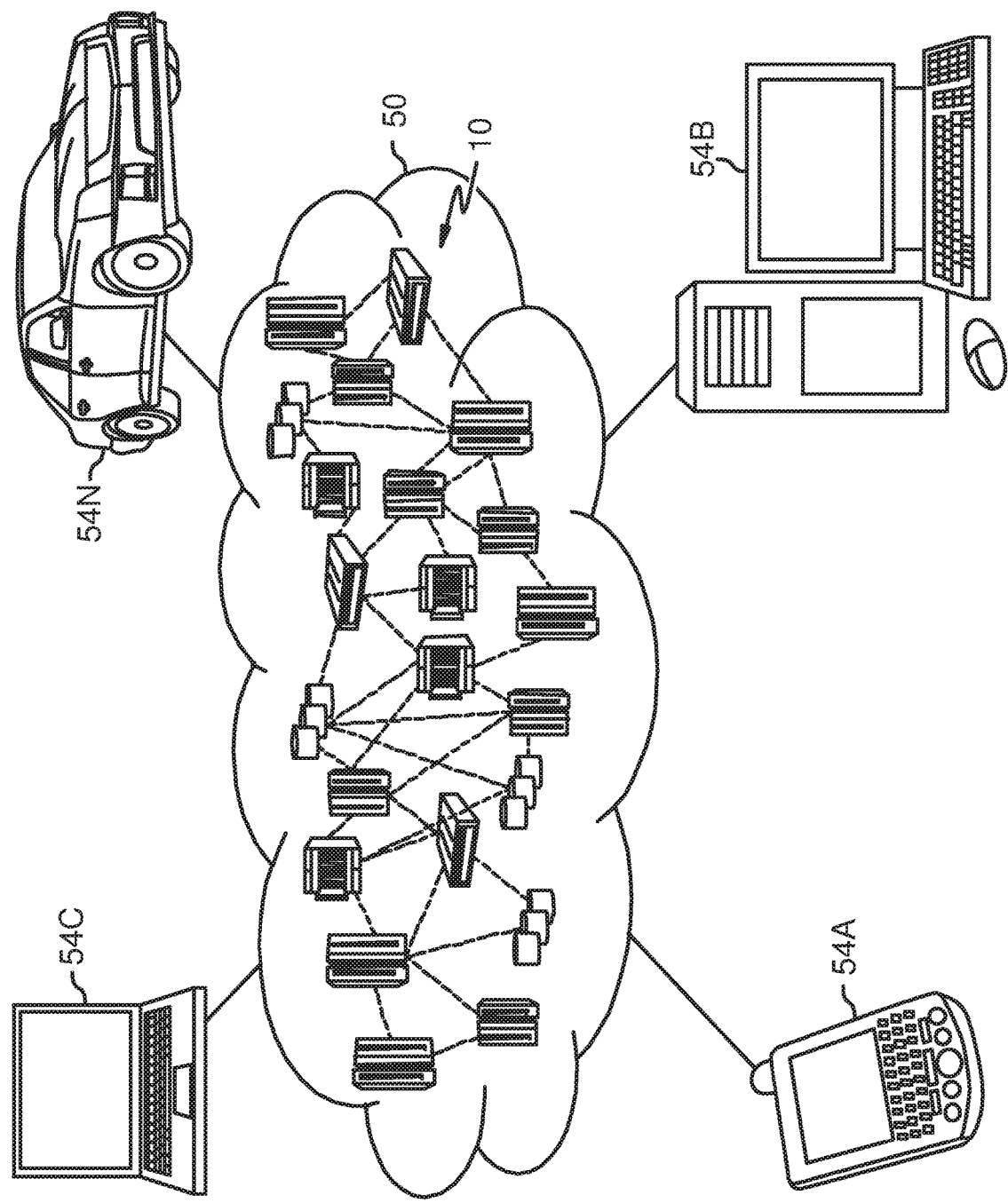
FIG. 9 depicts a cloud computing environment according to an embodiment of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
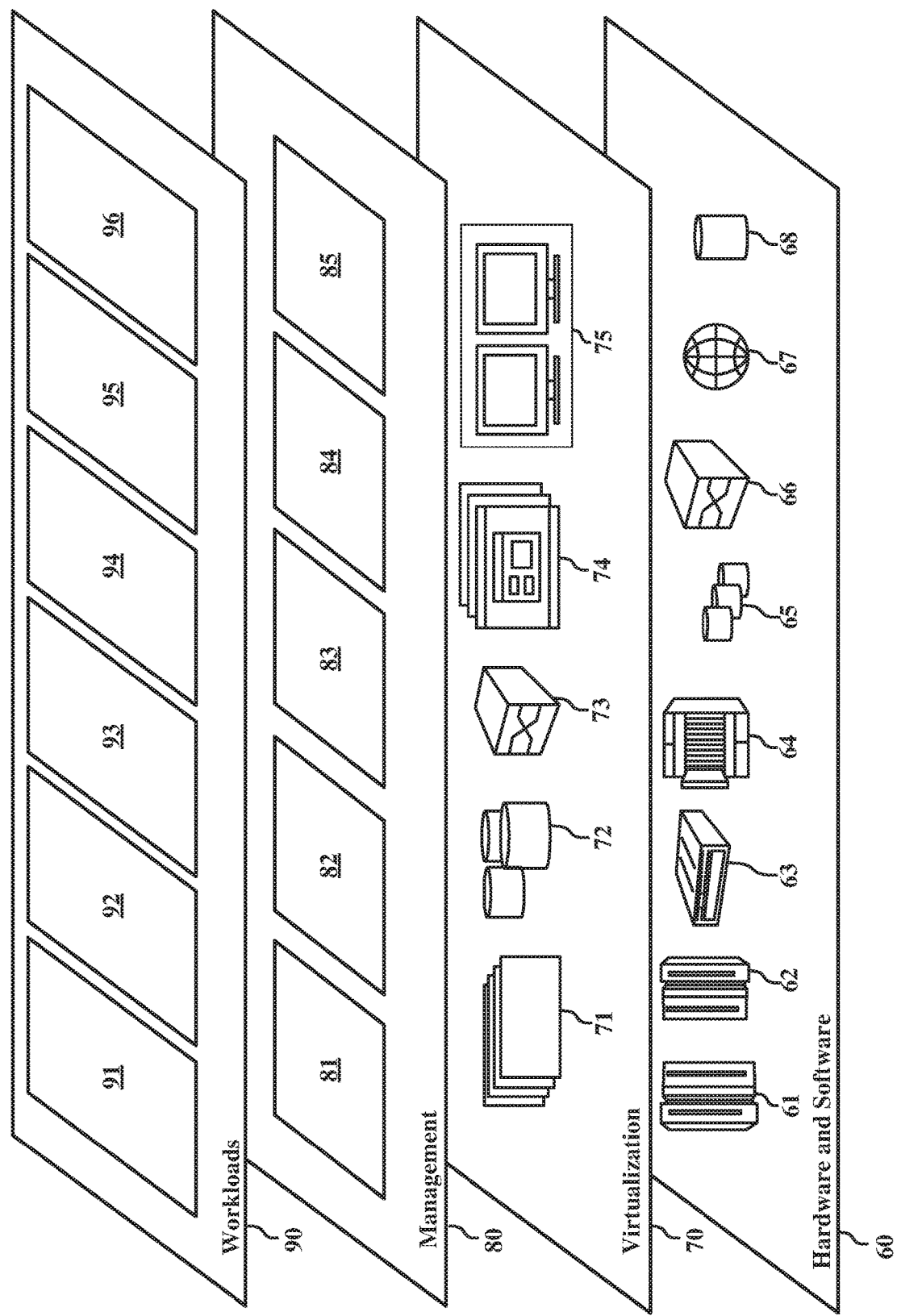
FIG. 10 depicts abstraction model layers according to an embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media control logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
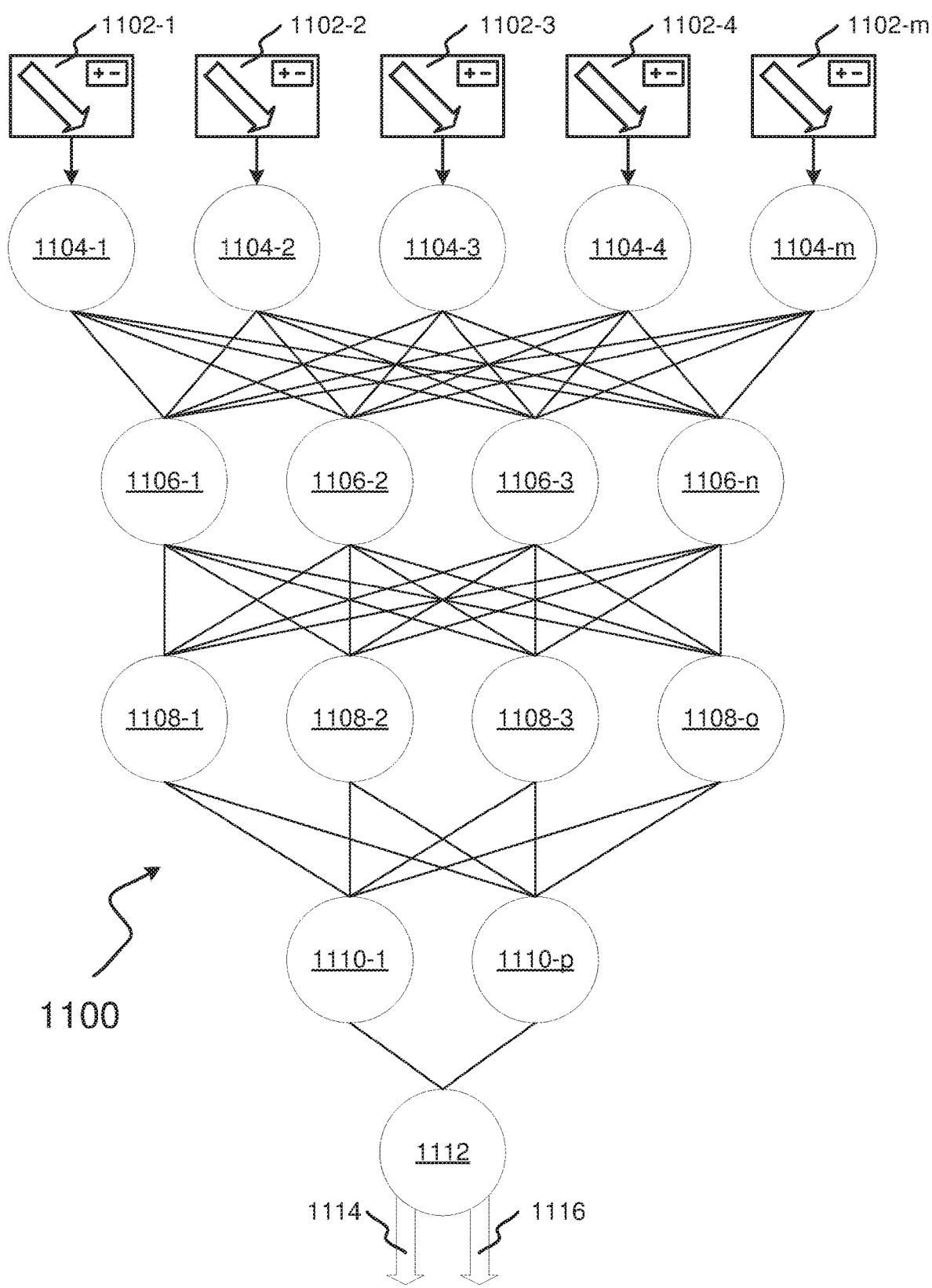
FIG. 11 depicts an example neural network that may be specialized to predict a distraction-level value, in accordance with embodiments of the present disclosure.

FIG. 11 depicts an example neural network 1100 that may be specialized to process a vehicle operator's personal data or mental states. For example, neural network 1100 may be specialized to process the personal data obtained at step 210 in FIG. 2, or mental state 450 of FIG. 4.

Neural network 1100 may be a classifier-type neural network. Neural network 1100 may be part of a larger neural network. For example, neural network 1100 may be nested within a single, larger neural network, connected to several other neural networks, or connected to several other neural networks as part of an overall aggregate neural network.

Inputs 1102-1 through 1102-$m$ represent the inputs to neural network 1100. In this embodiment, 1102-1 through 1102-$m$ do not represent different inputs. Rather, 1102-1 through 1102-$m$ represent the same input that is sent to each first-layer neuron (neurons 1104-1 through 1104-$m$) in neural network 1100. In some embodiments, the number of inputs 1102-1 through 1102-$m$ (i.e., the number represented by m) may equal (and thus be determined by) the number of first-layer neurons in the network. In other embodiments, neural network 1100 may incorporate 1 or more bias neurons in the first layer, in which case the number of inputs 1102-1 through 1102-$m$ may equal the number of first-layer neurons in the network minus the number of first-layer bias neurons. In some embodiments, a single input (e.g., input 1102-1) may be input into the neural network. In such an embodiment, the first layer of the neural network may comprise a single neuron, which may propagate the input to the second layer of neurons.

Inputs 1102-1 through 1102-$m$ may comprise one or more values of personal data or one or more mental states. Neural network 1100 comprises 5 layers of neurons (referred to as layers 1104, 1106, 1108, 1110, and 1112, respectively corresponding to illustrated nodes 1104-1 to 1104-$m$, nodes 1106-1 to 1106-$n$, nodes 1108-1 to 1108-$o$, nodes 1110-1 to 1110-$p$, and node 1112). In some embodiments, neural network 1100 may have more than 5 layers or fewer than 5 layers. These 5 layers may each comprise the same amount of neurons as any other layer, more neurons than any other layer, fewer neurons than any other layer, or more neurons than some layers and fewer neurons than other layers. In this embodiment, layer 1112 is treated as the output layer. Layer 1112 may output a probability (e.g., that a vehicle operator is distracted), and contains only one neuron (neuron 1112). In other embodiments, layer 1112 may contain more than 1 neuron. For example, layer 1112 may output the probability that a vehicle operator is in several mental states, and may contain one neuron for each of those mental states. In this illustration no bias neurons are shown in neural network 1100. However, in some embodiments each layer in neural network 1100 may contain one or more bias neurons.

Layers 1104-1112 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. This is also true in embodiments with more layers than are illustrated here, or fewer layers.

Layer 1112 is the output layer. In this embodiment, neuron 1112 produces outputs 1114 and 1116. Outputs 1114 and 1116 represent complementary probabilities that a target event will or will not occur. For example, output 1114 may represent the probability that a vehicle operator is distracted, and output 1116 may represent the probability that vehicle operator is not distracted. In some embodiments, outputs 1114 and 1116 may each be between 0.0 and 1.0, and may add up to 1.0. In such embodiments, a probability of 1.0 may represent a projected absolute certainty (e.g., if output 1114 were 1.0, the projected chance that the target event would occur would be 100%, whereas if output 1116 were 1.0, the projected chance that the target event would not occur would be 100%).

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   obtaining personal data of a vehicle operator,
      wherein the vehicle operator is operating a vehicle while media playback occurs within the vehicle,
   obtaining contextual data about the operating,
   generating a distraction-level value based at least in part on the personal data,
      wherein the distraction-level value represents a potential degree to which the vehicle operator is distracted from the media,
   generating a distraction threshold value based at least in part on the contextual data,
   comparing the distraction-level value to the distraction threshold value,
   determining at a first time that the distraction-level value exceeds the distraction threshold value, and
   adjusting the media in response to the determining at the first time.

2. The method of claim 1, wherein generating a distraction-level value comprises determining a mental state of the vehicle operator and wherein the distraction-level value is based at least in part on the determined mental state of the vehicle operator.

3. The method of claim 1, wherein adjusting the media comprises stopping the media playback.

4. The method of claim 3, further comprising:
   determining at a second time that the distraction threshold value exceeds the distraction-level value, wherein the second time is subsequent to the first time, and
   resuming media playback in response to the determining at the second time.

5. The method of claim 1, wherein the personal data of the vehicle operator comprises a heart rate variance of the vehicle operator.

6. The method of claim 1, wherein generating a distraction threshold value comprises developing a driving behavior profile of the vehicle operator.

7. A system comprising:
   a memory; and
   a processor communicatively coupled to the memory, wherein the processor is configured to perform a method comprising:
   obtaining personal data of a vehicle operator,
      wherein the vehicle operator is operating a vehicle while media playback occurs within the vehicle,
   obtaining contextual data about the operating,
   generating a distraction-level value based at least in part on the personal data,
      wherein the distraction-level value represents a potential degree to which the vehicle operator is distracted from the media,
   generating a distraction threshold value based at least in part on the contextual data, comparing the distraction-level value to the distraction threshold value,
   determining at a first time that the distraction-level value exceeds the distraction threshold value, and
   adjusting the media in response to the determining at the first time.

8. The system of claim 7, wherein generating a distraction-level value comprises determining a mental state of the vehicle operator and wherein the distraction-level value is based at least in part on the determined mental state of the vehicle operator.

9. The system of claim 7, wherein adjusting the media comprises stopping the media playback.

10. The system of claim 9, further comprising:
    determining at a second time that the distraction threshold value exceeds the distraction-level value, wherein the second time is subsequent to the first time, and
    resuming media playback in response to the determining at the second time.

11. The system of claim 7, wherein the personal data of the vehicle operator comprises a heart rate variance of the vehicle operator.

12. The system of claim 7, wherein generating a distraction threshold value comprises developing a driving behavior profile of the vehicle operator.

13. A computer program product comprising a computer readable storage medium having program instructions embodied therewith, the program instructions executable by a processor to cause the processor to perform a method comprising:
   obtaining personal data of a vehicle operator,
      wherein the vehicle operator is operating a vehicle while media playback occurs within the vehicle,
   obtaining contextual data about the operating,
   generating a distraction-level value based at least in part on the personal data,
      wherein the distraction-level value represents a potential degree to which the vehicle operator is distracted from the media,
   generating a distraction threshold value based at least in part on the contextual data,
   comparing the distraction-level value to the distraction threshold value,
   determining at a first time that the distraction-level value exceeds the distraction threshold value, and
   adjusting the media in response to the determining at the first time.

14. The computer program product of claim 13, wherein generating a distraction-level value comprises determining a mental state of the vehicle operator and wherein the distraction-level value is based at least in part on the determined mental state of the vehicle operator.

15. The computer program product of claim 13, wherein adjusting the media comprises stopping the media playback.

16. The computer program product of claim 15, further comprising:
   determining at a second time that the distraction threshold value exceeds the distraction-level value, wherein the second time is subsequent to the first time, and
   resuming media playback in response to the determining at the second time.

17. The computer program product of claim 13, wherein the personal data of the vehicle operator comprises a heart rate variance of the vehicle operator.

18. The computer program product of claim 13, wherein generating a distraction threshold value comprises developing a driving behavior profile of the vehicle operator.

* * * * *